United States Patent
Marczynski et al.

(10) Patent No.: US 6,561,124 B1
(45) Date of Patent: May 13, 2003

(54) POSITION INDICATOR ASSEMBLY FOR NUTS AND OR BOLTS

(75) Inventors: Michael Marczynski, Manchester (GB); John Marriott, Somerset (GB)

(73) Assignee: Business Lines Limited, Manchester (GB)

(*) Notice: Subject to any disclaimer, the term of this patent is extended or adjusted under 35 U.S.C. 154(b) by 0 days.

(21) Appl. No.: 09/831,562

(22) PCT Filed: Nov. 11, 1999

(86) PCT No.: PCT/GB99/03765

§ 371 (c)(1),
(2), (4) Date: Jun. 7, 2001

(87) PCT Pub. No.: WO00/29755

PCT Pub. Date: May 25, 2000

(30) Foreign Application Priority Data

Nov. 13, 1998 (GB) ............................................. 9824822

(51) Int. Cl.⁷ ................................................. G09F 11/04
(52) U.S. Cl. ........................ 116/309; 116/315; 116/317; 116/306; 411/8; 411/14; 411/910; 411/377
(58) Field of Search ................................. 116/315, 317, 116/318, 309, 316, 1, 306, 212; 411/14, 8, 910, 431, 337, 377

(56) References Cited

U.S. PATENT DOCUMENTS

| 3,693,495 A | * | 9/1972 | Wagner | 411/377 |
|---|---|---|---|---|
| 3,730,132 A | * | 5/1973 | Brown et al. | 116/309 |
| 4,213,416 A | * | 7/1980 | Klingler | 116/309 |
| 4,482,278 A | * | 11/1984 | Dorn | 411/377 |
| 4,900,206 A | * | 2/1990 | Kazino et al. | 411/377 |
| 5,120,174 A | | 6/1992 | Patti | |
| 5,165,831 A | * | 11/1992 | Yager et al. | 411/14 |
| 5,324,149 A | * | 6/1994 | Bainbridge et al. | 411/431 |
| 5,350,266 A | * | 9/1994 | Espey et al. | 411/431 |
| 5,449,260 A | * | 9/1995 | Whittle | 411/377 |
| 5,549,432 A | * | 8/1996 | Reneau | 441/431 |
| 5,669,104 A | * | 9/1997 | Howie, Jr. | 116/309 |
| 5,967,721 A | * | 10/1999 | Giachinta et al. | 411/14 |
| 6,053,681 A | * | 4/2000 | Mattershead | 411/195 |

FOREIGN PATENT DOCUMENTS

| FR | 2531155 A1 | * | 2/1984 | 411/431 |
|---|---|---|---|---|
| FR | 2556058 A1 | * | 6/1985 | 411/337 |
| GB | 2120795 A | * | 5/1982 | 116/212 |
| GB | 2 242 720 A | | 10/1991 | |
| GB | 235505 A | * | 11/1998 | 411/14 |

* cited by examiner

Primary Examiner—Diego Gutierrez
Assistant Examiner—Travis Reis
(74) Attorney, Agent, or Firm—Oliff & Berridge, PLC.

(57) ABSTRACT

In order to provide a visible indication of loosening of a nut or a bolt relative to another member to which it is threadably engaged, a rotation indicator assembly comprises a first element, which is permanently secured to the nut or bolt and a second element which is adapted to be releasably and non-rotatably mounted in or on the first element, e.g. by interengagement with teeth in any chosen rotational position, and incorporates means, such as pointer, for indicating its rotational position relative to a fixed reference. The first element may take the form of an insert, an integral formation, or an external fitment. The fixed reference may be provided by an independently mounted marker secured by the nut or bolt.

11 Claims, 3 Drawing Sheets

POSITION INDICATOR ASSEMBLY FOR NUTS AND OR BOLTS

This invention concerns rotation indicator means, that is to say a position indicator assembly for use with first and second members which are or are to be rotationally engaged with each other, particularly where one member is to be threadedly engaged into or onto the other member, and more particularly where that one member is a bolt or a nut, respectively.

According to the present invention such an assembly comprises a first element which is permanently secured to either the nut or the bolt and a second element which is adapted to be releasably and non-rotatably mounted on or in the first element in a selected one of a plurality of positions and incorporates means of indicating its rotational position relative to a reference.

In embodiments of the invention presently envisaged the first and second members may comprise a nut and a bolt, or vice versa, or a nut and a threaded stud projecting from a larger substrate, or a bolt and a threaded bore in a larger substrate.

The first element will, however, always be secured to or formed integrally with either the nut or the bolt.

In a specific practical embodiment the first element may conveniently comprise an insert, e.g of nylon, fixed inside the bore of a nut, as in a lock nut, but with a protruding portion serving as a carrier or mounting means for the second element, which incorporates some form of indicia to indicate the position thereof relative to the third element, which comprises a marker of some sort held in place by the aforesaid nut.

In alternative embodiments, the insert may not protrude, in which case it will be apertured and the second element will engage inside it.

In other practical embodiments the first element may be formed integrally on the nut (and need not protrude) or it may take the form of an external fitment.

Equivalent embodiments to all the foregoing may be applied to the head of a bolt.

The invention can, of course, be applied to any shape or size of nut or bolt.

The invention can usefully be applied in cases where the nut or the bolt head is large or the space surrounding the nut and/or bolt is confined, in which cases the first element of the assembly can be an insert of relatively small diameter on or in which the indicator element (second element) can be mounted.

The second element may additionally serve as a cap or cover when fitted on or in the first element. Alternatively, the second element may itself be formed in two parts, one part being a separable cap or cover, which may carry the means indicating the rotational position of the second element.

The reference may advantageously be provided by a third element of the assembly which is adapted to be secured in position by either the nut or the bolt. In this respect, the third element can be a washer or a modified washer which is held in position by, or at least partially by, the nut or the bolt.

In embodiments where a third element is not provided, the reference may be provided by an external feature, such as an adjacent nut or bolt, or the pointer on an adjacent indicator assembly, or simply a mark applied on the adjacent substrate.

Various examples of the three elements of the assembly of the present invention will now be more particularly described with reference to the accompanying drawings in which.

Figure 1:
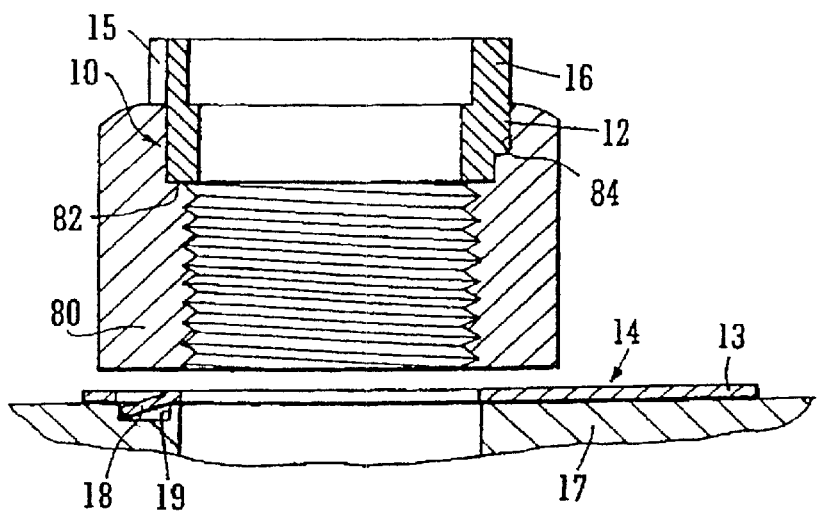
FIG. 1 is a cross section showing a first embodiment of the first and third elements of the indicator assembly of the invention as applied to a nut.
Figure 2:
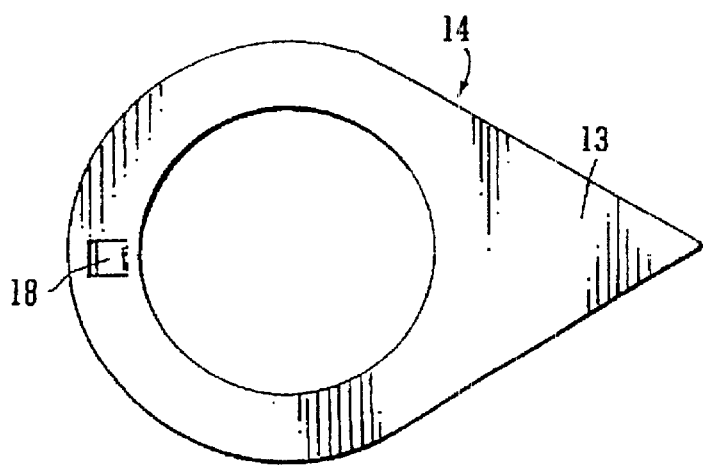
FIG. 2 is a plan view of the third element, ie the reference or marker element of the assembly shown in FIG. 1.
Figure 3:
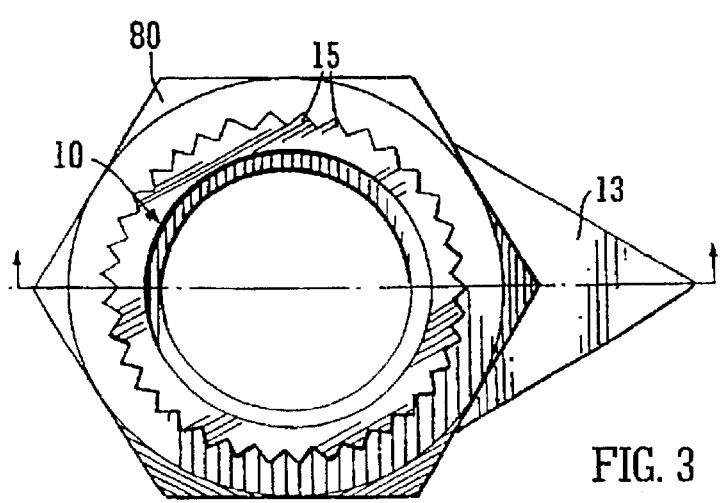
FIG. 3 is a plan view corresponding to FIG. 1 showing the same versions of the first and third elements of the assembly in position on a nut.

With reference to FIGS. 1 to 3, a first embodiment of the inventive assembly comprises three parts or elements, namely a carrier (10) (first element), an indicator (not shown here) (second elezent) and a marker (14) (third element).

The carrier in this case is an annular plastics insert (10) which can be moulded separately and inserted into the internal bore of a nut (80) so as to be permanently, fixedly secured thereto. In this respect, the insert (10) is radically located by means of a small projecting tongue (12) which engages into a corresponding notch (84) in the internal wall of the nut (80) and is axially located by the upsetting of the adjacent surface of the nut (80). The insert (10) extends part way into the bore of the nut (80), abutting an annular shoulder (82) formed therein, and also has a portion (16) which protrudes upwardly or outwardly from the end of the nut (80) to provide means for the mounting of the indicator.

The protruding portion (16) of the insert (10) is provided, around its outer periphery, with teeth (15), as best shown in FIG. 3.

The marker (14) is a fixed reference datum, which in this embodiment is pear shaped, comprising a flat aperture disc formed with a pointer (13), as best shown in FIG. 2. It is provided with a cut out tab (18) which is deflected out of the plane of the marker (14) and, in use, engages in a notch or slot (19) of corresponding size in a substrate (17) to which the nut (80) will be bolted.

Thus, the marker (14) will be held.in place between the nut (80) and the substrate (17) as the nut (80) is tightened, and by virtue of the engagement of the tab (18) in the notch (19) it will not be able to change its position either longitudinally, transversely or rotationally.

The indicator may comprises a known form of wheelnut position indicator of the applicants manufacture having an annular portion and a pointer, the annular portion having teeth around its interior and being adapted in size to be a close fit over the protruding portion (16) of the insert (10). The respective teeth of the insert (10) and the indicator interengage so that by removal and rotation the indicator can be mounted onto the insert (10) in a selected one of a plurality of positions.

Figure 6:
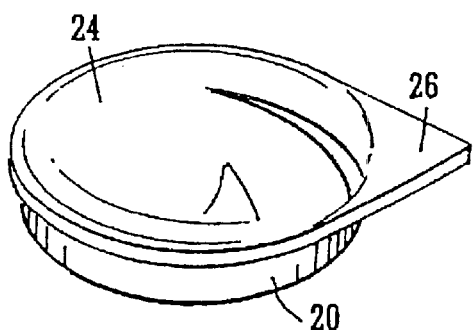
FIGS. 6 to 8 are perspective views of three different versions of the second element ie the indicator element, of the assembly of the invention which can be fitted onto any of the first element versions shown in FIGS. 1 and 3, 4, 5, 10, 11 or 12.
Figure 7:
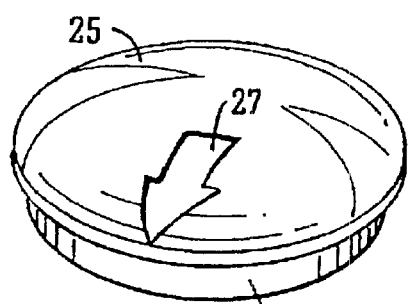
Figure 9:
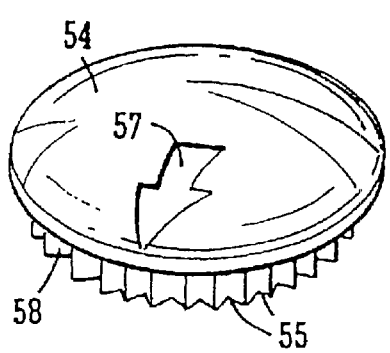
FIG. 9 is a perspective view of another version of the second element of the assembly of the invention which in this case could be fitted inside a first element of the style shown in FIG. 13.

Alternatively, the indicator may take the form shown in FIG. 6 or FIG. 7 or FIG 9. Each of these comprises a respective annular-portion (20) having internal teeth (22). (not shown in the case of FIGS. 6 and 7) adapted to fit over and interengage the teeth (15) on the insert (10). The version shown in FIG. 6 is formed with an integral cap or cover (24) and a protruding pointer (26). The version shown in FIG. 7 is also formed with an integral cap or cover (25), but this has an arrow (27) marked thereon instead of a protruding pointer. The version shown in FIG. 8 does not have a cap and is formed with an angled or cranked pointer (28).

The purpose of providing an indicator with a cap or closure (24, 25) as in FIGS. 6 and 7 is to provide a cover to the engaged assembly to prevent dust or other detritus from clogging the connection and to minimise ingress of any material which would lead to corrosion.

In use, the marker (14) is held in place and the nut (80) is secured to the substrate (17) by threaded engagement with a bolt (not shown) which in this case will extend through the substrate (17) and the marker (14) and into, possibly through,the bore of the nut (80) too. The indicator, of whatever form, is located onto the insert (10) after the nut and bolt assembly has been tightened to the desired degree, the position of the indicator being secured so that the pointer (26, 28) or arrow (27) overlies or is directed towards the pointer (15) of the marker (14). Since the marker (14) cannot be displaced, any subsequent change in the position of the pointer (26, 28) or arrow (27) relative to the pointer (15) of the marker (14) is indicative of rotation of the nut (80) relative to the substrate (17) i.e. loosening of the nut. Thus regular inspection can pick up any loosening which can be remedied.

In other embodiments where a marker, such as (14), is not provided, a fixed reference point relative to which rotation of the indicator element will be apparent, can be provided by any fixed mark or feature external to the assembly, or by arranging adjacent indicator pointers or arrows to align point to point or all in the same direction (elephant file) or in some other suitable pattern.

It is believed that such an assembly would be extremely useful fitted to nut and bolt assemblies which secure fish-plates between railway tracks, so as to provide an immediate visible indication of any loosening of a nut—which can then be tightened. This would save a great deal of time and labour compared to the present system of manually testing the torque in each case.

Many variations are possible within the scope of the invention, it only being necessary that the carrier portion is formed on or fixedly secured to either a nut or a bolt of a threadedly engagable assembly, that the indicator is releasably and non-rotatably mountable on said carrier, and that a reference point, such as an independently mounted marker, is provided relative to which rotation of the nut or bolt can be visually indicated.

The carrier may be integrally formed on the nut or bolt in the course of manufacture or be formed thereon afterwards by separate casting, forging or moulding, and then be fixedly secured thereto, for example in the manner previously described with reference to FIG. 1.

Figure 4:
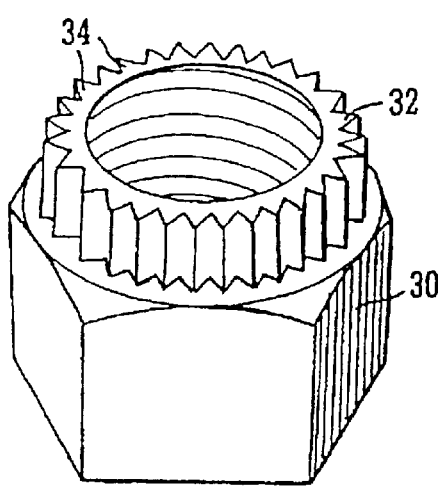
FIG. 4 is a perspective view showing another embodiment of the first element of the assembly of the invention, as applied to a nut.

FIG. 4 shows a nut (30) formed with an integral upstanding annular projection (32) which constitutes a carrier element of an inventive assembly. This carrier portion (32) has teeth (34) around its periphery and an indicator (not shown), similar to that in any of FIGS. 6, 7 or 9 or the other annular indicator described above, may be non-rotatably mounted thereon. The third element, ie the marker, is not shown in this instance.

The carrier or first element of the assembly of the invention may alternatively be formed as an external fitment mounted on the nut or bolt.

Figure 5:
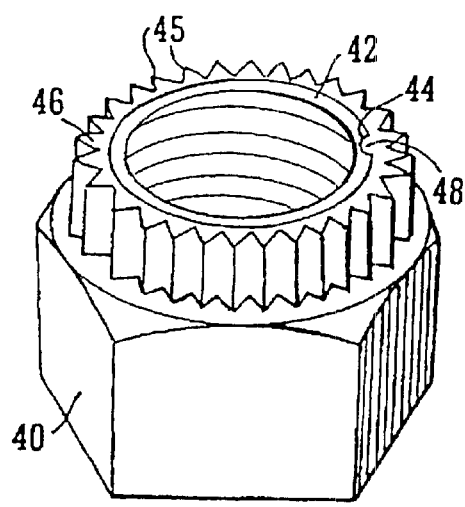
FIG. 5 is a similar perspective view showing another embodiment of the first element of the invention as applied to a nut.

In this respect, FIG. 5 shows a nut (40) formed with an integral upstanding annular projection (42) which has a small notch (44) formed at one position in its external surface. A carrier element in the form of a close fitting collar (46) is fitted over this upstanding projection (42), a tongue (48) in the inner surface of the collar (46) locating into the notch (44). The collar (46) may be formed of plastics, e.g nylon, just as the insert (10) in FIG. 1, and, of course, it has a plurality of teeth (45) formed around its exterior.

As before, an indicator element similar to those shown in any of FIGS. 6, 7, 9 or the other annular indicator element previously described may be mounted thereon.

Figure 10:
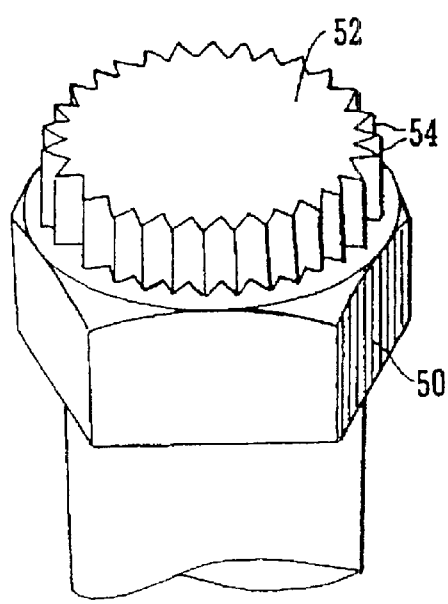
FIG. 10 is a fragmentary perspective view showing a bolt head provided with an integral first element of the invention.
Figure 11:
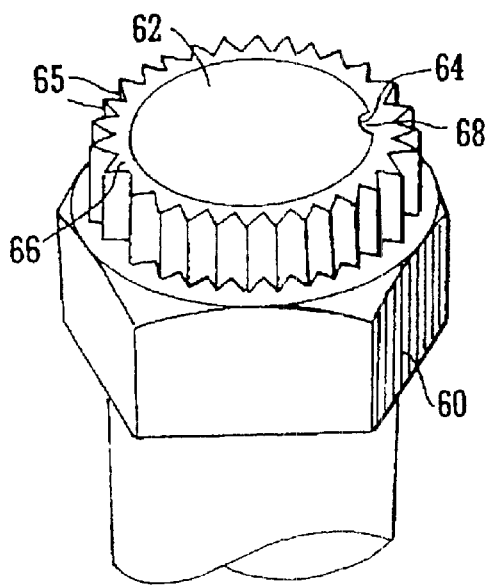
FIG. 11 is a similar view showing a bolt head provided with an externally fitted first element.
Figure 12:
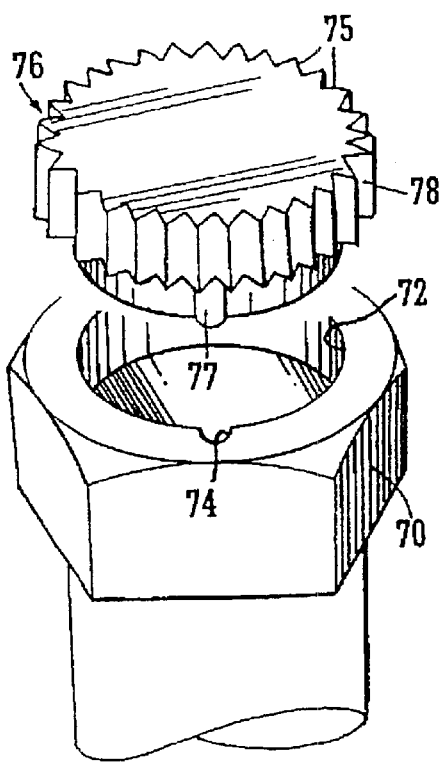
FIG. 12 is a similar view showing how a bolt head can be provided with a first element, in the form of a partial insert.

FIGS. 10 to 12 show three different carrier elements applied to the head of a bolt. These carrier elements take the form, respectively, of an integrally formed projection, an external collar, and an upstanding insert, each having peripheral teeth over which an indicator element as in FIGS. 6, 7 or 9 or as otherwise described may be fitted. Thus these correspond to the carrier elements shown applied to nuts in FIGS. 4, 5 and FIGS. 1 to 3, as previously described.

More particularly, FIG. 10 shows a bolt head (50) having a carrier in the form of an integrally formed cylindrical projection (52) with peripheral teeth (54). FIG. 11 shows a bolt head (60) having an integrally formed cylindrical projection (62) with a small notch (64) cut into its periphery. A carrier element in the form of a close fitting collar (66) is fitted over the projection (62), a tongue (68) in the inner surface of the collar (64) locating in the notch (64). The collar (64) has teeth (65) around-its periphery. Finally, FIG. 12 shows a bolt head (70) formed with a central well (72) having a notch (74) in its wall. A carrier element in the form of a cylindrical insert (76) fits into the well (72), a tongue (77) in its lower portion locating in the notch (74). An upper portion (78) of the insert (76) projects proud of the top surface of the bolt head (70) and carries teeth (75) around its periphery. This upper portion (78) may be of a larger diameter than the well (72) in the bolt head (70).

In all the above described cases, marker elements of any suitable form may be secured by the respective bolt heads (50), (60) or (70) as the bolts are securely engaged into threaded bores (not shown) in substrates or through apertures in substrates and into nuts or the like.

In this respect, marker elements as shown in FIG. 2 may be employed, or they may take any other suitable form such as a conventional disc like washer to which a visible reference mark or spot or the like is applied (instead of a specially farmed pointer).

In other embodiments of the invention, the carrier element need not have teeth around its periphery. Instead, teeth could be formed around an internal annular surface, and an indicator element could then be formed with external teeth so as to fit inside the carrier element.

Figure 13:
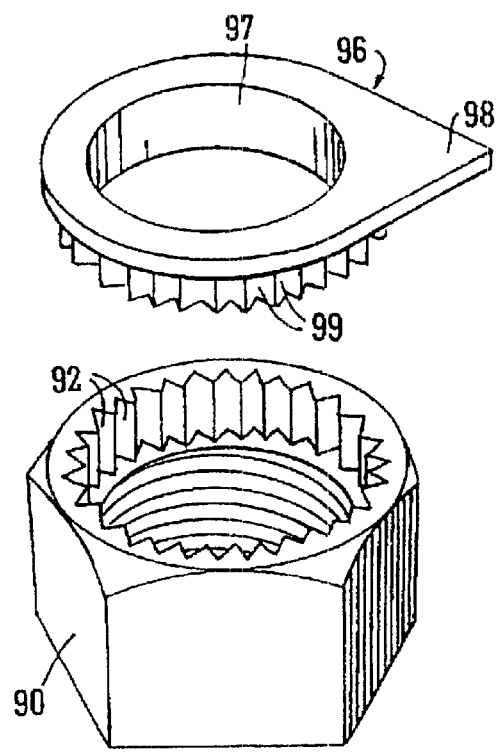
FIG. 13 is a similar view showing a nut provided with another version of an integral first element and with another version of an aperture second, indicator element.

Such an arrangement is shown in FIG. 13 where a nut (90) is either provided in an upper region of its bore with integral teeth (92) or is provided with an insert element having such teeth (92). An indicator element (96) comprises an annular flange (97) and a pointer (98), the annular flange (97) being formed with external teeth (99) to interengage the teeth (92).

A comparable carrier element with internal teeth could similarly be applied to a bolt head.

Figure 8:
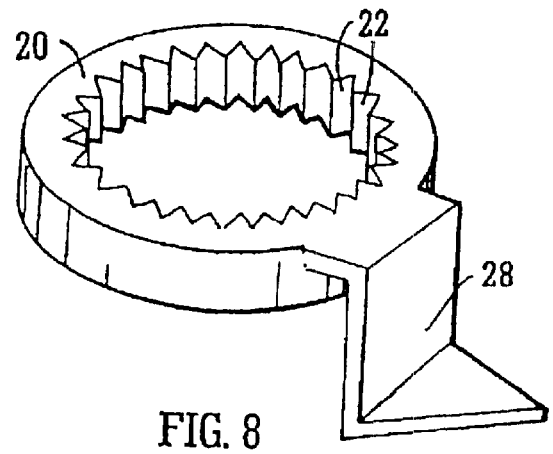

FIG. 8 shows another version of indicator element similar to that in FIG. 7, and incorporating a cap or cover (54) with an arrow (57) marked thereon, but having teeth (55) formed around the outside of the annular portion (58) so that the annular portion (58) can fit inside an internally toothed carrier element, such as that shown in FIG. 13, as applied to either a nut or bolt head.

Although interengagement of the indicator element and the carrier element is conveniently by way of teeth, it is not essential to have teeth. A plurality of corners or grooves/projections would work equally well in allowing interengagement in a selected number of different positions. In the case of teeth these need not be a continuous array around the respective surfaces. At least one of the surfaces might only be provided with teeth at spaced intervals.

The marker element, when provided, preferably has some means of location relative to a substrate or one of the engaging members, such as the tab in FIGS. 1 and 2. However this is not essential.

Other variations will be apparent to those skilled in the art based on the general principles enunciated herein.

What is claimed is:

1. A position indicator assembly for use with first and second members which are or are to be threadedly engaged with each other, one of said first and second members being a nut or a bolt, the assembly comprising a first element which is permanently secured to either the nut or the bolt and a second element which is adapted to be releasably and non-rotatably mounted on or in the first element, in which respect the first element is formed with a plurality of teeth and the second element is formed with corresponding teeth which engage with the teeth of the first element in a selected one of a plurality of positions, and in which respect the second element also incorporates means of indicating its rotational position relative to a reference.

2. An assembly according to claim 1 wherein the first element is secured to either the nut or the head of the bolt and takes the form of an insert.

3. An assembly according to claim 2 wherein the insert has a portion protruding from the nut or bolt head to serve as carrier or mounting means for the second element.

4. An assembly according to claim 1 wherein the first element is secured to either the nut or the head of the bolt and takes the form of an external fitment.

5. An assembly according to claim 1 wherein the second element includes a pointer for indicating its rotational position relative to the reference.

6. An assembly according to claim 1 wherein the second element serves as a cap or cover when fitted on or in the first element.

7. An assembly according to claim 1 wherein the second element is itself formed in two parts, one part being a separable cap or cover.

8. An assembly as claimed in claim 7 wherein the separable cap or cover carries the means of indicating the rotational position of the second element.

9. An assembly according to claim 1 further comprising a third element which provides the reference and is adapted to be secured by either the nut or the bolt.

10. A position indicator assembly for use with first and second members which are or are to be threadedly engaged with each other, one of said first and second members being a nut or a bolt, the assembly comprising a first element which is permanently secured to either the nut or the bolt, a second element which is adapted to be releasably and non-rotatably mounted on or in the first element in a selected one of a plurality of positions and incorporates means of indicating its rotational position relative to a reference, and a third element which provides the reference and is adapted to be secured by either the nut or the bolt.

11. A position indicator assembly for use with first and second members which are or are to be threadedly engaged with each other, one of said first and second members being a nut or a bolt, the assembly comprising a first element which is integrally formed as an extension of or protrusion from either the nut or the bolt, and a second element which is adapted to be releasably and non-rotatably mounted on or in the first element in a selected one of a plurality of positions and incorporates means of indicating its rotational position relative to a reference.

* * * * *